United States Patent
Akatsu

(10) Patent No.: US 10,948,864 B2
(45) Date of Patent: Mar. 16, 2021

(54) IMAGE DENSITY CORRECTION FOR AN IMAGE FORMING APPARATUS

(71) Applicant: Shinichi Akatsu, Kanagawa (JP)

(72) Inventor: Shinichi Akatsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/578,049

(22) Filed: Sep. 20, 2019

(65) Prior Publication Data
US 2020/0103806 A1      Apr. 2, 2020

(30) Foreign Application Priority Data

Sep. 27, 2018   (JP) .............................. JP2018-181479

(51) Int. Cl.
*G03G 15/00*      (2006.01)

(52) U.S. Cl.
CPC ..... *G03G 15/5041* (2013.01); *G03G 15/5058* (2013.01); *G03G 15/5062* (2013.01); *G03G 15/556* (2013.01); *G03G 2215/00063* (2013.01); *G03G 2215/00067* (2013.01)

(58) Field of Classification Search
CPC ............. G03G 15/5041; G03G 15/556; G03G 15/5058; G03G 2215/00063; G03G 15/5062; G03G 15/043; G03G 2215/00067; G03G 2215/00037; G03G 2215/00042; G03G 2215/00755

See application file for complete search history.

(56) References Cited

U.S. PATENT DOCUMENTS

| | | |
|---|---|---|
| 2005/0105926 A1 | 5/2005 | Akatsu et al. |
| 2007/0212086 A1 | 9/2007 | Yagawara et al. |
| 2008/0019718 A1 | 1/2008 | Akatsu et al. |
| 2008/0138094 A1* | 6/2008 | Shiori .................. G03G 15/065 399/9 |
| 2008/0317486 A1 | 12/2008 | Monma et al. |
| 2010/0040389 A1 | 2/2010 | Akatsu |
| 2011/0228355 A1 | 9/2011 | Morita et al. |
| 2012/0189328 A1* | 7/2012 | Suzuki ............... G03G 15/0189 399/32 |
| 2013/0164004 A1* | 6/2013 | Ai ....................... G03G 15/0189 399/40 |

(Continued)

FOREIGN PATENT DOCUMENTS

| | | |
|---|---|---|
| JP | 2014-170195 | 9/2014 |
| JP | 2018-077516 | 5/2018 |

*Primary Examiner* — Walter L Lindsay, Jr.
*Assistant Examiner* — Laura Roth
(74) *Attorney, Agent, or Firm* — Duft & Bornsen, PC

(57) ABSTRACT

An image forming apparatus includes an image bearer, an image forming section, an image density difference detector, and control circuitry. The image forming section is configured to form a gradation image pattern on a surface of the image bearer. The gradation image pattern includes gradation images having different image densities stepwise in a sub-scanning direction. The image density difference detector is configured to detect image density differences in a main scanning direction of the gradation images. The control circuitry is configured to execute an image density difference correction mode that corrects the image density differences in the main scanning direction based on detection results detected by the image density difference detector.

8 Claims, 11 Drawing Sheets

(56) References Cited

U.S. PATENT DOCUMENTS

| | | |
|---|---|---|
| 2014/0169814 A1 | 6/2014 | Uematsu et al. |
| 2014/0255046 A1* | 9/2014 | Takemura .......... G03G 15/5062 399/15 |
| 2014/0268242 A1 | 9/2014 | Kaneko et al. |
| 2014/0270827 A1 | 9/2014 | Muto et al. |
| 2014/0270828 A1 | 9/2014 | Suzuki et al. |
| 2015/0316885 A1 | 11/2015 | Uematsu et al. |
| 2015/0362868 A1 | 12/2015 | Sone et al. |
| 2016/0112580 A1 | 4/2016 | Muto et al. |
| 2016/0246220 A1 | 8/2016 | Sone et al. |
| 2017/0017177 A1* | 1/2017 | Iwata ................. G03G 15/5058 |
| 2018/0074431 A1* | 3/2018 | Nomura ............. G06K 15/1261 |
| 2019/0163108 A1 | 5/2019 | Sakurada et al. |
| 2019/0204771 A1* | 7/2019 | Taki ................... G03G 15/5041 |

\* cited by examiner

DIRECTION OF
CONVEYANCE OF SHEET

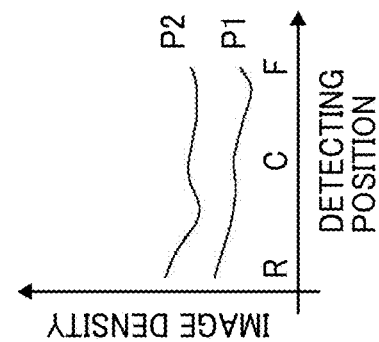
FIG. 9C
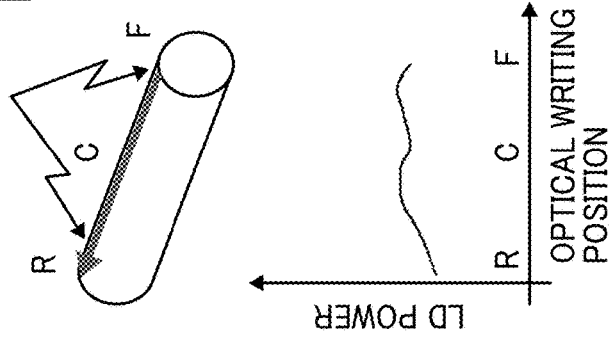
FIG. 9B
FIG. 9E
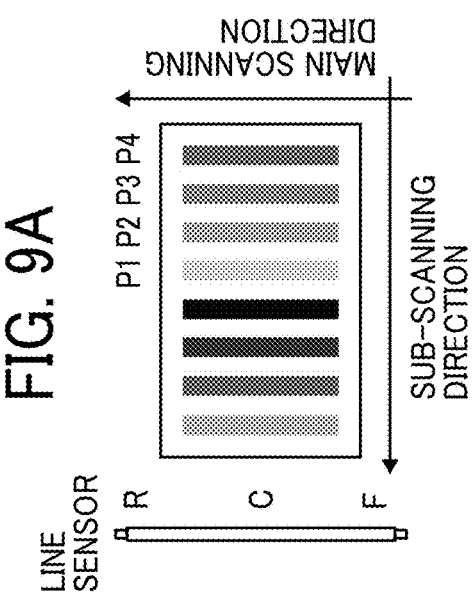
FIG. 9A
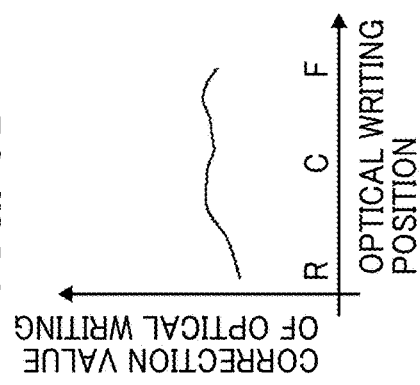
FIG. 9D

IMAGE DENSITY CORRECTION FOR AN IMAGE FORMING APPARATUS

CROSS-REFERENCE TO RELATED APPLICATION

This patent application is based on and claims priority pursuant to 35 U.S.C. § 119 to Japanese Patent Application No. 2018-181479, filed on Sep. 27, 2018 in the Japan Patent Office, the entire disclosure of which is hereby incorporated by reference herein.

BACKGROUND

Technical Field

Embodiments of the present disclosure relate to an image forming apparatus, such as a copy, a printer, a facsimile machine, or a multifunction peripheral thereof.

Background Art

Some image forming apparatuses, such as copiers and printers, correct image density in a main scanning direction.

SUMMARY

This specification describes an improved image forming apparatus that includes an image bearer, an image forming section, an image density difference detector, and control circuitry. The image forming section is configured to form a gradation image pattern on a surface of the image bearer. The gradation image pattern includes gradation images having different image densities stepwise in a sub-scanning direction. The image density difference detector is configured to detect image density differences in a main scanning direction of the gradation images. The control circuitry is configured to execute an image density difference correction mode that corrects the image density differences in the main scanning direction based on detection results detected by the image density difference detector.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIGS. 9A to 9E are diagrams and graphs illustrating a manual correction flow of the image density difference;

Figure 1:
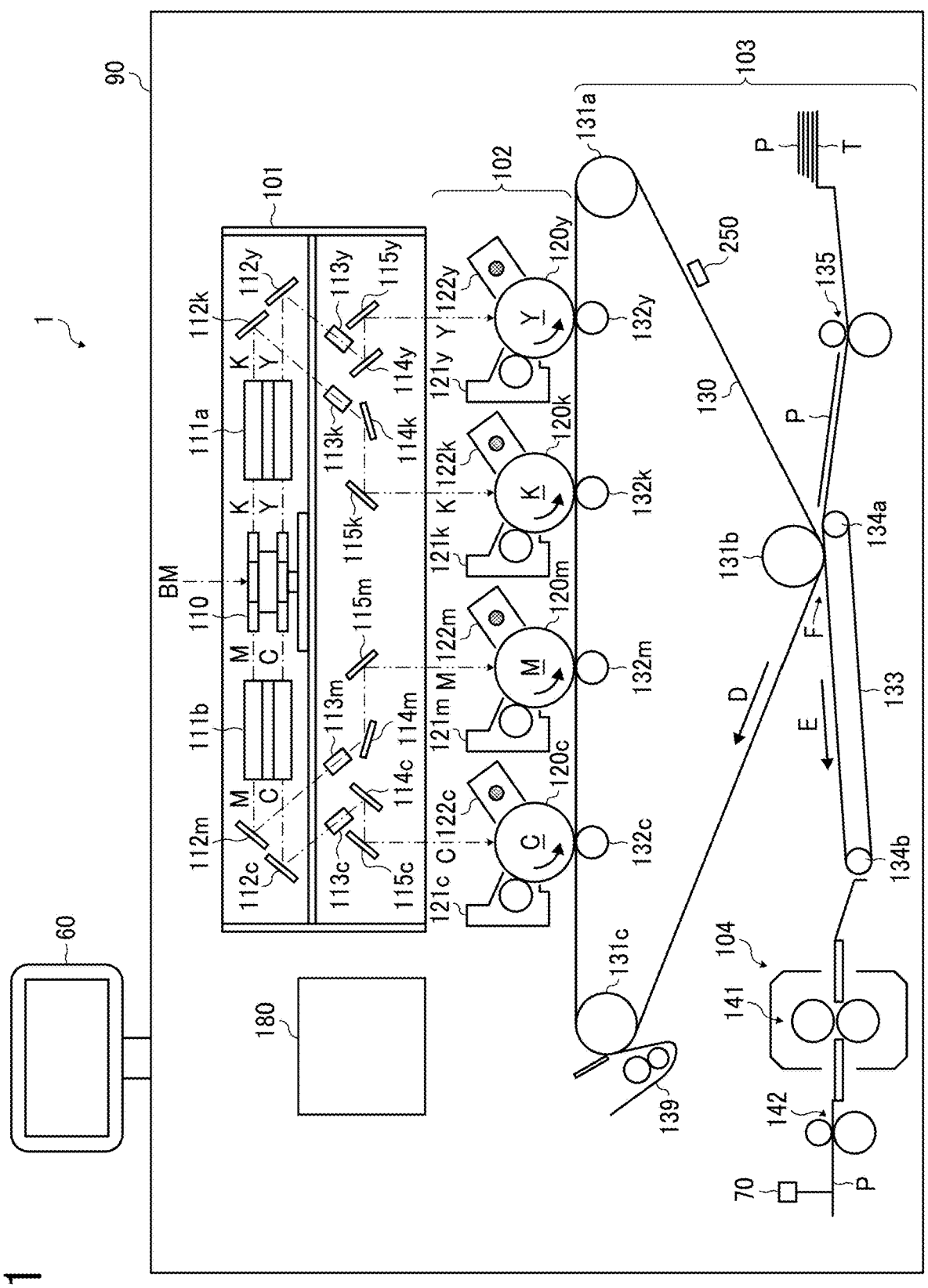
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings illustrating the following embodiments, the same reference numbers are allocated to elements having the same function or shape and redundant descriptions thereof are omitted below.

With reference to FIG. 1, an overall configuration and operations of an image forming apparatus 1 is described.

The image forming apparatus 1 in the present embodiment is a color printer and includes, in a housing 90 of the image forming apparatus 1, an exposure device 101, an image forming device 102, a transfer device 103, a fixing device 104, and a line sensor 70 as an image density difference detector that is an image density sensor to detect an image density difference, and an image density sensor 250 used for an image forming condition adjustment. Above the housing 90, the image forming apparatus includes a control panel 60 as an operation unit.

In the present embodiment, a printer engine 100 including the exposure device 101, the image forming device 102, and the transfer device 103 functions as an image forming section to form an image on a recording medium sheet P as an image bearer.

The image forming device 102 includes four photoconductors that are a photoconductor 120y for a yellow (Y) image, a photoconductor 120k for a black (K) image, a photoconductor 120m for a magenta (M) image, and a photoconductor 120c for a cyan (C) image and are aligned opposite an intermediate transfer belt 130.

The photoconductors 120y, 120k, 120m, and 120c each are surrounded by developing devices 121y, 121k, 121m, and 121c, chargers 122y, 122k, 122m, and 122c, cleaners, dischargers, and the like, respectively.

The transfer device 103 includes the intermediate transfer belt 130, a secondary transfer belt 133, and the like.

The fixing device 104 includes a fixing roller 141, a pressure roller pressed against the fixing roller 141, an ejection roller 142, and the like.

With reference to FIG. 1, a typical image forming operation executed by the image forming apparatus 1 is described below.

The exposure device 101 irradiates surfaces of the photoconductors 120y, 120k, 120m, and 120c in the image forming device 102 with exposure light based on image data to form latent images corresponding to desired images on the photoconductors 120y, 120k, 120m, and 120c. In other words, the exposure device 101 emits exposure light selectively at writing positions corresponding to the image pattern of the image data and with the intensity of exposure light corresponding to image density. An exposure light source may be a laser beam source or a LED light source. In the exposure device 101, a polygon mirror 110 deflects exposure light beams BM emitted from the exposure light source, and each of the exposure light beams BM enters scanning lenses 111a and 111b each including an fθ lens. An operation of emitting exposure light from the exposure light source is described later.

The exposure light beams BM corresponding to yellow (Y), black (K), magenta (M), and cyan (C) images are emitted from the exposure light source, pass through the scanning lenses 111a and 111b, and are reflected by reflection mirrors 112y, 112k, 112m, and 112c.

Specifically, a yellow exposure light beam Y transmits the scanning lens 111a, is reflected by the reflection mirror 112y, and enters a long toroidal lens (WTL) 113y. Exposure light beams K, M, and C for black, magenta, and cyan color images are guided in a similar manner.

WTL lenses 113y, 113k, 113m, and 113c shape the incident exposure light beams Y, K, M, and C, respectively, and then deflect the exposure light beams Y, K, M, and C to the reflection mirrors 114y, 114k, 114m, and 114c. The respective exposure light beams Y, K, M, and C are further reflected by reflection mirrors 115y, 115k, 115m, and 115c and guided to irradiate the surfaces of the photoconductors 120y, 120k, 120m, and 120c.

Synchronization of timing of irradiation of the photoconductors 120y, 120k, 120m, and 120c with the exposure light beams Y, K, M, and C are performed with respect to a main scanning direction and a sub-scanning direction on the photoconductors 120y, 120k, 120m, and 120c. In the present embodiment, the photoconductors 120y, 120k, 120m, and 120c are drum-shaped members, that is, photoconductor drums, that rotate counterclockwise in FIG. 1, and a direction of each rotation axis is the main scanning direction.

The main scanning direction on the photoconductors 120y, 120k, 120m, and 120c is defined as the scanning direction of the exposure light beams, and the sub-scanning direction is defined as the direction orthogonal to the main scanning direction, that is, the direction of rotation of the photoconductors 120y, 120k, 120m, and 120c is the sub-scanning direction.

The photoconductors 120y, 120k, 120m, and 120c include a photoconductive layer including at least a charge generation layer and a charge transport layer on a conductive drum such as aluminum.

After the chargers 122y, 122k, 122m, and 122c charge the surfaces of the photoconductors 120y, 120k, 120m, and 120c, exposure light beams are irradiated to form electrostatic latent images.

The developing devices 121y, 121k, 121m, and 121c develop the electrostatic latent images formed on the surfaces of the photoconductors 120y, 120k, 120m and 120c to form toner images.

The toner images formed on the surfaces of the photoconductors 120y, 120k, 120m, and 120c are primarily transferred and superimposed onto the intermediate transfer belt 130 that is moved in a direction of arrow D by conveyance rollers 131a to 131c at positions of the primary transfer rollers 132y, 132k, 132m, and 132c, respectively. In this manner, a multicolor toner image is formed on the intermediate transfer belt 130.

Subsequently, the multicolor toner image formed on the intermediate transfer belt 130 moves to a secondary transfer position F in which the secondary transfer belt 133 is pressed against the intermediate transfer belt 130. The secondary transfer belt 133 is wound around conveyance rollers 134a and 134b and conveyed in a direction indicated by arrow E by the conveyance rollers 134a and 134b.

A conveyance roller 135 feeds a sheet P from a sheet container T such as a sheet tray to the secondary transfer position F. At the secondary transfer position F, with application of a secondary transfer bias, the multicolor toner image carried on the intermediate transfer belt 130 is transferred onto the sheet P attracted and held on the secondary transfer belt 133. A belt cleaner 139 removes residual untransferred toner remaining on the intermediate transfer belt 130 after the secondary transfer at the secondary transfer position F.

Subsequently, the secondary transfer belt 133 conveys the sheet P to the fixing device 104. The fixing device 104 presses and heats the sheet P to fix the multicolor toner image secondarily transferred onto the sheet P and not fixed on the sheet P. The ejection roller 142 ejects the sheet P on which the multicolor toner image is fixed, as the sheet P after image formation, from the fixing device 104. The sheet P ejected from the fixing device 104 passes through a position opposite the line sensor 70 and is ejected to the outside of the image forming apparatus 1 as an output image.

Thus, a sequence of image forming processes performed in the image forming apparatus 1 is completed.

In the present embodiment, the line sensor 70 as an image density difference detector to detect an image density difference in the main scanning direction of the image formed on the surface of the sheet P as the image bearer is disposed downstream from the fixing device 104, and the image density difference, that is, an image density unevenness, in the main scanning direction is corrected based on a detection result of the line sensor 70, which is described in detail later.

In the present embodiment, the rotational directions of the photoconductors 120y, 120k, 120m, and 120c, the conveyance direction of the intermediate transfer belt 130, and the conveyance directions of the sheets P are the sub-scanning direction perpendicular to the main scanning direction.

Further, in the present embodiment, the image density sensor 250 called a P sensor is disposed opposite the intermediate transfer belt 130 downstream from the image forming device 102 and upstream from the secondary transfer position F. The image density sensor 250 optically detects an image density of a patch pattern formed at a predetermined position in the main scanning direction, for example, at the central position in the main scanning direction and on the intermediate transfer belt 130. The image forming section forms the patch pattern that is a rectangular image on the intermediate transfer belt 130 while the image forming apparatus 1 warms up or when the image forming section does not output images between sheets. The image density sensor 250 detects the image density of the patch pattern. The image forming condition adjustor adjusts image forming conditions such as developing biases applied to the developing devices 121y, 121k, 121m and 121c or charging biases applied to the chargers 122y, 122k, 122m and 122c so that the detected image densities become target image densities. The image forming condition adjustor is a control unit 180 that is control circuitry and controls outputs of high voltage power sources to output the developing biases, charging biases, and the like.

Figure 2:
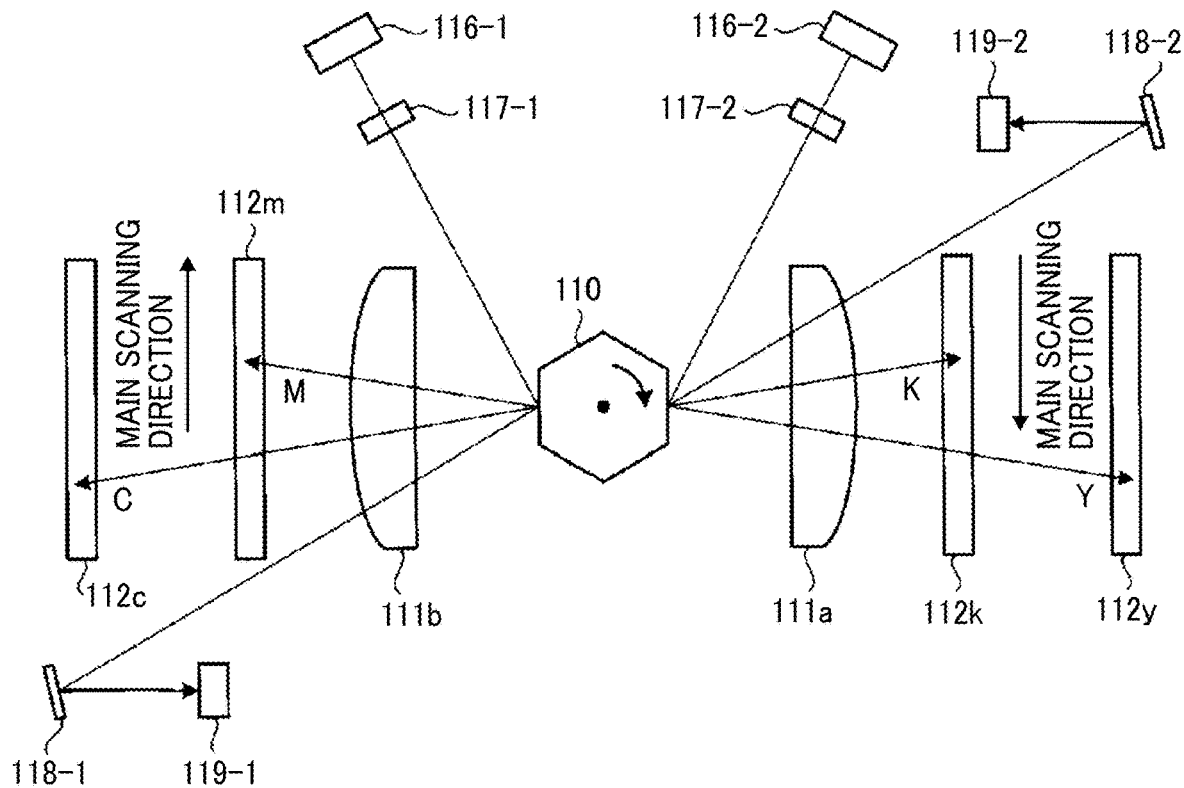
FIG. 2 is a schematic diagram illustrating a configuration of an exposure device of the image forming apparatus.

With reference to FIG. 2, a detailed description is given of the configuration of the exposure device 101 described above with reference to FIG. 1 and an optical path of the exposure light beam BM.

As illustrated in FIG. 2, the exposure device 101 includes two laser diode (LD) units 116-1 and 116-2 as the exposure light source. Each of two LD units 116-1 and 116-2 includes a laser element. The laser elements are driven to emit exposure light beams selectively at writing positions, that is, exposure positions, corresponding to image data and with the intensity of exposure light corresponding to the image data.

The exposure light beams emitted from a first LD unit 116-1 passes through a cylinder lens 117-1 and are directed to the polygon mirror 110 rotated by a polygon motor. An upper portion and a lower portion of the first LD unit 116-1 include LDs, respectively. For example, the magenta exposure light beam is emitted from the upper LD and directed to the upper portion face of the polygon mirror 110, and the cyan exposure light beam is emitted from the lower LD and directed to the lower portion face of the polygon mirror 110.

The magenta exposure light beam directed to the upper surface of the polygon mirror 110 is deflected as the polygon mirror 110 rotates. The deflected magenta exposure light beam passes through the scanning lens 111b and enters the reflection mirror 112m. The magenta exposure light beam reflected at the reflection mirror 112m scans the photoconductor 120m for magenta.

The cyan exposure light beam directed to the lower surface of the polygon mirror 110 is deflected as the polygon mirror 110 rotates. The deflected cyan exposure light beam passes through the scanning lens 111b and enters the reflection mirror 112c. The cyan exposure light beam reflected at the reflection mirror 112c scans the photoconductor 120c for cyan.

A synchronous mirror 118-1 and a synchronous sensor 119-1 are disposed in a non-image writing area, which is in an end portion on a writing start side in the main scanning direction and outside a writing start position in the main scanning direction. The magenta and cyan exposure light beams transmitted through the scanning lens 111b are reflected by the synchronous mirror 118-1 and enters the synchronous sensor 119-1. The synchronous sensor 119-1 outputs synchronization detection signals for determining the timing of start of writing in the main scanning direction of respective colors as the exposure light beams for magenta and cyan enter the synchronous sensor 119-1.

Similarly, the exposure light beams emitted from a second LD unit 116-2 passes through a cylinder lens 117-2 and are directed to the polygon mirror 110 rotated by a polygon motor. An upper portion and a lower portion of the second LD unit 116-2 also include LDs, respectively. For example, the black exposure light beam is emitted from the upper LD and directed to the upper portion face of the polygon mirror 110, and the yellow exposure light beam is emitted from the lower LD and directed to the lower portion face of the polygon mirror 110.

The black exposure light beam directed to the upper surface of the polygon mirror 110 is deflected as the polygon mirror 110 rotates. The deflected black exposure light beam passes through the scanning lens 111a and enters the reflection mirror 112k. The black exposure light beam reflected at the reflection mirror 112k scans the photoconductor 120k for black.

The yellow exposure light beam directed to the lower surface of the polygon mirror 110 is deflected as the polygon mirror 110 rotates. The deflected yellow exposure light beam passes through the scanning lens 111a and enters the reflection mirror 112y. The yellow exposure light beam reflected at the reflection mirror 112y scans the photoconductor 120y for yellow.

A synchronous mirror 118-2 and a synchronous sensor 119-2 are disposed in a non-image writing area, which is in an end portion on a writing start side in the main scanning direction and outside a writing start position in the main scanning direction. The black and yellow exposure light beams transmitted through the scanning lens 111a are reflected by the synchronous mirror 118-2 and enters the synchronous sensor 119-2. The synchronous sensor 119-2 outputs synchronization detection signals for determining the timing of start of writing in the main scanning direction of respective colors as the exposure light beams for black and yellow enter the synchronous sensor 119-2.

Figure 3:
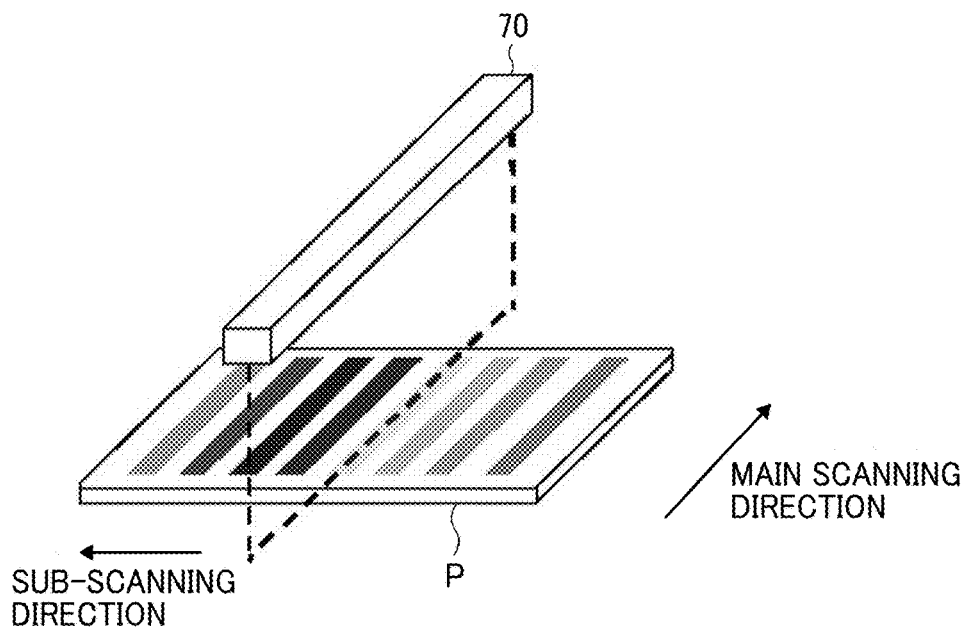
FIG. 3 is a schematic perspective view illustrating a line sensor and a sheet on which gradation image patterns are formed.
Figure 4:
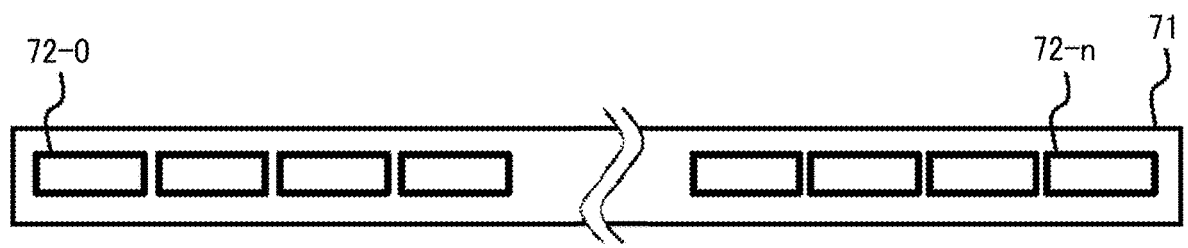
FIG. 4 is a schematic diagram illustrating a line sensor extending in a main scanning direction.
Figure 5:
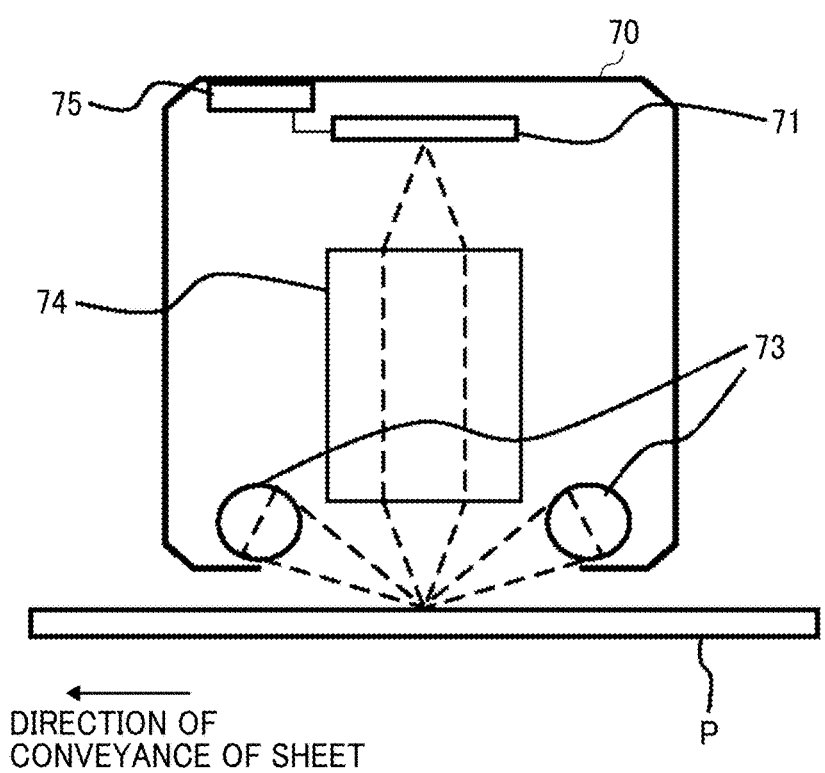
FIG. 5 is a schematic diagram illustrating a configuration of the line sensor.

With reference to FIGS. 3 to 5, a configuration of the line sensor 70 as the image density difference detector is described below.

As illustrated in FIG. 3, a longitudinal direction of the line sensor 70 is parallel to the main scanning direction. The line sensor 70 includes an image sensor 71 extending in the longitudinal direction that is the main scanning direction. The image sensor 71 includes a plurality of light-receiving elements 72-0 to 72-n arranged in the longitudinal direction. The range in which the light-receiving elements 72-0 to 72-n are arranged is a detection width of the line sensor 70 in the main scanning direction. The detection width of the line sensor 70 in the main scanning direction is indicated by a broken line in FIG. 3. The line sensor 70 detects image densities over an entire area in the main scanning direction of the sheet P conveyed in the sub scanning direction.

In the present embodiment, the line sensor 70 functions as the image density difference detector to detect the image density difference in the main scanning direction of the image formed on the sheet P. The image density difference detector is not limited to a detector that detects image densities in the main scanning direction, such as the line sensor 70. The image density difference detector may be a detector that detects image densities in a plurality of places in the main scanning direction, for example, three places at both ends and the center in the main scanning direction. Or, the image density difference detector may be image density sensors disposed at both ends in the main scanning direction and approximating the image density at the center portion by using a linear approximation, which is difficult to directly detect the image density.

Additionally, as illustrated in FIG. 5, the line sensor 70 includes light sources 73, a lens array 74, an output circuit 75 and the like in addition to the image sensor 71. The broken lines in FIG. 5 represent the light emitted from the light sources 73.

The light sources 73 may be a light guide having an end provided with a light emitting element or a light-emitting diode (LED) arrays. The light sources 73 emit light of red, green, and blue (RGB). A SELFOC® lens may be used as the lens array 74.

The light emitted from the light source 73 is reflected on the sheet P conveyed and focused by the lens array 74. The light-receiving elements 72 illustrated in FIG. 4 in the image sensor 71 receives the light focused by the lens array 74 and outputs a signal corresponding to the light received. For example, a complementary metal oxide semiconductor (CMOS) sensor or a charge-coupled device (CCD) sensor is used as the image sensor 71.

For example, an application specific integrated circuit (ASIC) or the like is used as the output circuit 75. Based on the signal from each light-receiving element 72 on the image sensor 71, the output circuit 75 outputs data indicating the image density of the pattern corresponding to the position on the sheet P in the main scanning direction. For example, the output circuit 75 outputs 0 to 255 gradations represented by 8 bits.

Figure 6:
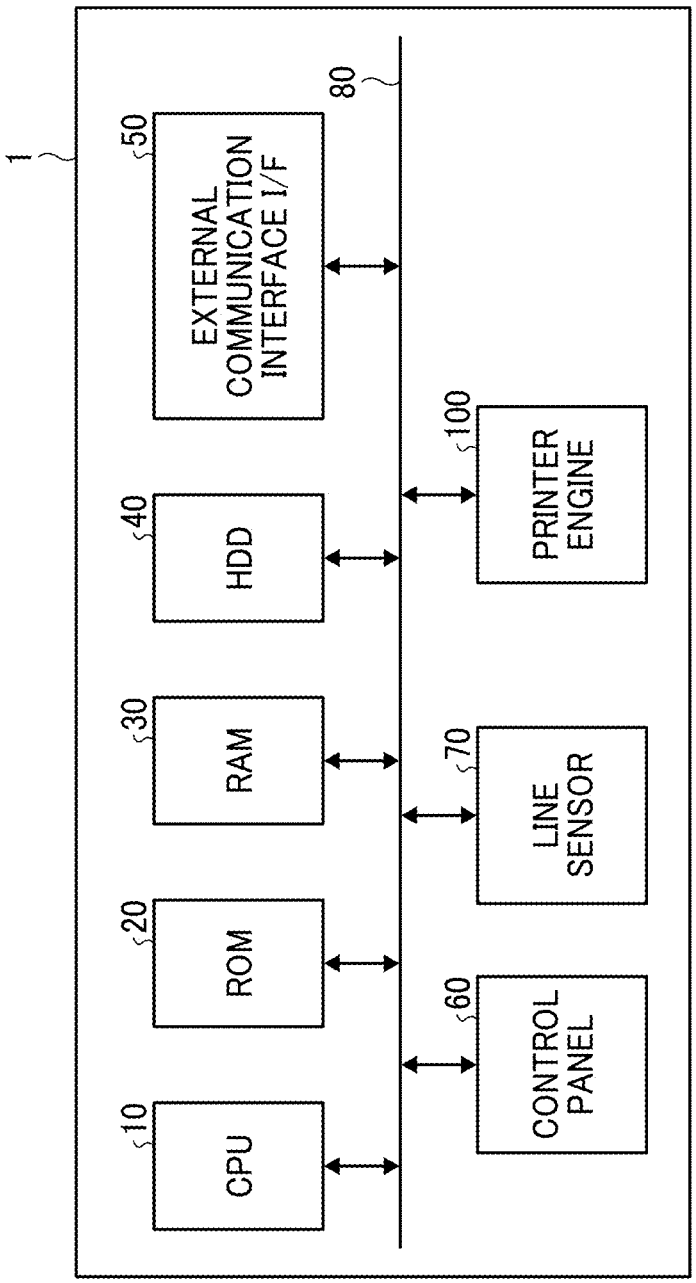
FIG. 6 is a schematic block diagram illustrating a hardware configuration of an image forming apparatus.

With reference to FIG. 6, a hardware configuration of the image forming apparatus 1 is described below.

As illustrated in FIG. 6, the image forming apparatus 1 includes a center processing unit (CPU) 10, a read only memory (ROM) 20, a random access memory (RAM) 30, a hard disk drive (HDD) 40, an external communication interface (I/F) 50, the control panel 60, the line sensor 70 as the image density sensor, and the printer engine 100, which interconnect via a system bus 80.

The CPU 10 is control circuitry and controls operation of the image forming apparatus 1. The CPU 10 executes programs stored in the ROM 20 or the HDD 40, using the RAM 30 as a work area, to control the entire operation of the image forming apparatus 1. Thus, the CPU 10 implements various functions such as copying, scanning, facsimile communication, and printing functions described above.

The ROM 20 is a nonvolatile semiconductor memory that can retain data even after the power is turned off. The RAM 30 is a volatile semiconductor memory that temporarily stores programs and data.

The HDD 40 is a nonvolatile memory that stores programs or data. Programs and data stored in the HDD 40 include an operating system (OS), which is basic software for controlling the entire image forming apparatus 1, various application programs operating on the OS, and operation conditions of various functions such as the copy function mentioned above. The HDD 40 can further store execution of each of such functions (hereinafter also "job") each time as operation logs of the image forming apparatus 1.

The external communication interface I/F 50 is an interface that connects the image forming apparatus 1 to a network such as the Internet and a local area network (LAN). The image forming apparatus 1 receives a print instruction, image data, and the like from an external device via the external communication interface I/F 50.

The control panel 60 as the operation unit accepts various inputs corresponding to operation of a user and displays various types of information such as information indicating the operation accepted, information indicating the operational status of the image forming apparatus 1, and information indicating the setting of the image forming apparatus 1. The control panel 60 may include, for example, a liquid crystal display (LCD) device equipped with a touch panel function. The control panel 60 may include an operation unit such as hardware keys and/or a display unit such as an indicator lamp. The control panel 60 is controlled by the CPU 10.

The printer engine 100 as the image forming section is hardware for implementing the printer function and the like.

The programs stored in the ROM 20 or the HDD 40 are processable by a computer. Such programs may be installed in the ROM 20 or the HDD 40 during manufacturing or at the shipment of the image forming apparatus 1 or may be installed after sales.

Figure 7:
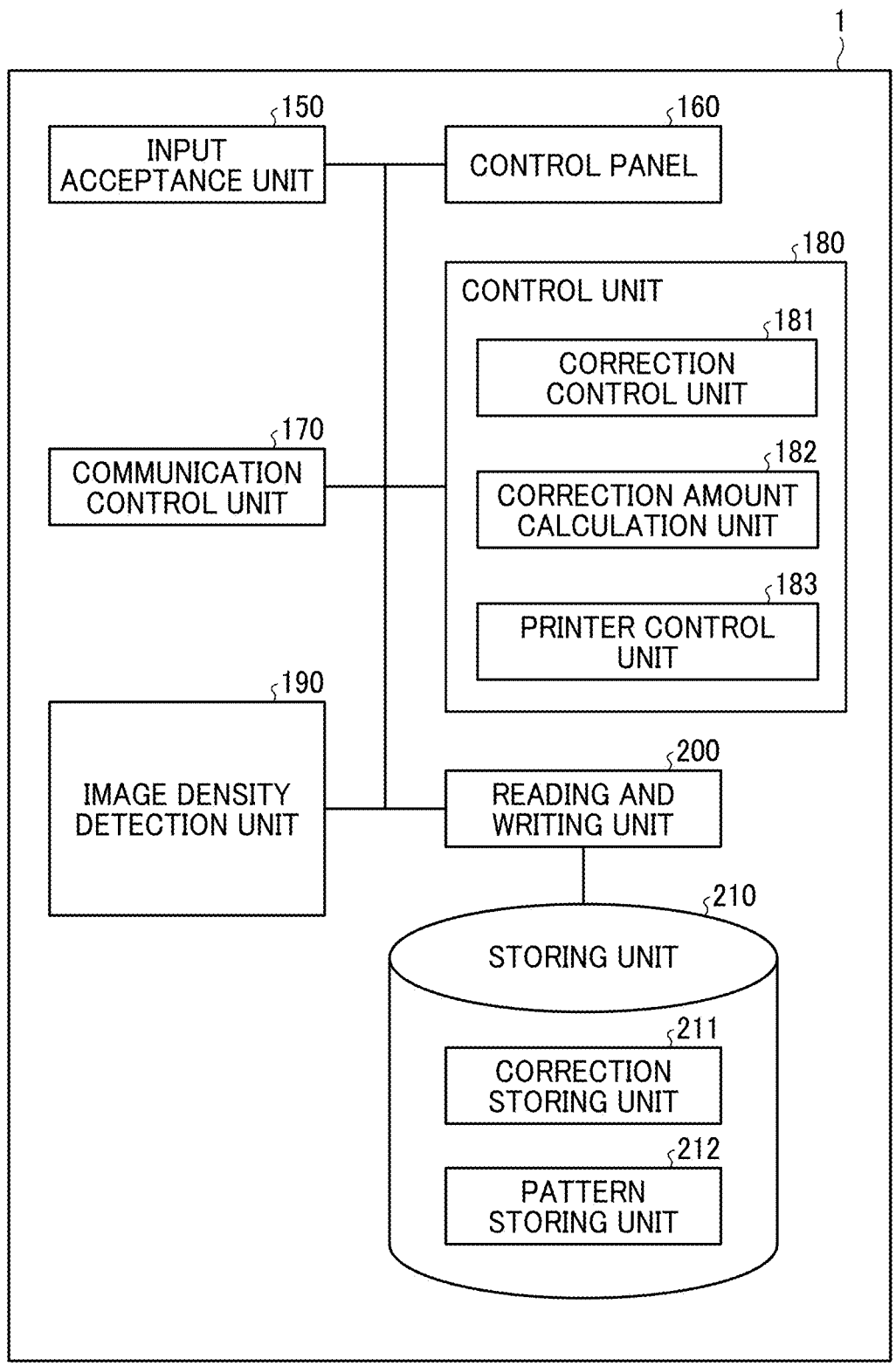
FIG. 7 is a functional block diagram of the image forming apparatus.

With reference to FIG. 7, a functional block diagram of the image forming apparatus 1 is described.

As illustrated in FIG. 7, the input acceptance unit 150 is implemented by processing of the control panel 60. The input acceptance unit 150 is configured to display information necessary for the operation to the user and accept various inputs made by the user. The input acceptance unit 150 is also implemented by the processing of the external communication interface I/F 50 and accepts a print instruction or setting change by a user, input from an external device via a LAN or the Internet.

The display control unit 160 is implemented by the CPU 10 executing a program stored in the ROM 20 or HDD 40, using the RAM 30 as a work area. The display control unit 160 controls a display screen to be displayed on the input acceptance unit 150.

The communication control unit 170 is implemented by the processing of the external communication interface I/F 50. To transmit via email the image data to the outside or accept various types of setting information from an external device, the communication control unit 170 communicates with the external device via a network. The control unit 180 is implemented by the CPU 10 executing a program stored in the ROM 20 or the HDD 40 using the RAM 30 as the work area and configured to control overall functions of the image forming apparatus 1.

The control unit 180 includes a correction control unit 181, a correction amount calculation unit 182, and a printer control unit 183. The correction control unit 181 controls correction of uneven image density in the printer function. The correction amount calculation unit 182 calculates correction amounts of an image forming condition to correct the uneven image density. The printer control unit 183 controls the printer engine 100. The control unit 180 functions as a correction unit that corrects the image density difference in the main scanning direction and executes an image density difference correction mode at a predetermined timing, which is described in detail later.

An image density detection unit 190 is implemented by the line sensor 70, detects image densities of gradation image patterns formed by the printer engine 100, and outputs detection results.

A reading and writing unit 200 is implemented by the CPU 10 executing a program stored in the ROM 20 or the HDD 40 using the RAM 30 as the work area. The reading and writing unit 200 stores various types of data in a storing unit 210 and retrieves the data stored therein.

The storing unit 210 is implemented by the ROM 20 or the HDD 40 to store programs, document data, various image forming conditions and various setting information necessary for the operations of the image forming apparatus 1, and operation logs of the image forming apparatus 1. Examples of the image forming conditions include a charging bias, a developing bias, the intensity of exposure light that is the intensity of optical writing light, and a transfer bias.

Various information stored in the storing unit 210 may be set before shipment of the image forming apparatus 1 or may be updated after sales. The storing unit 210 may be implemented by the temporary storage function of the RAM 30 depending on the stored information.

The storing unit 210 includes a correction storing unit 211 and a pattern storing unit 212. The correction storing unit 211 stores correction contents of various image forming conditions.

Figure 8:
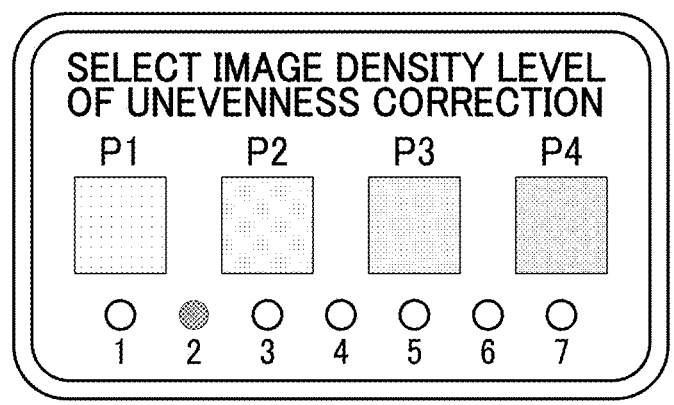
FIG. 8 is a view illustrating a screen of a control panel for manual correction of an image density difference.

With reference to FIGS. 8 and 9, procedure is described of correction of the image density difference in the main scanning direction that is performed by a manual operation of the user.

The image forming apparatus 1 according to the present embodiment performs the image density difference correction mode that automatically corrects the image density difference in the main scanning direction, which is described later.

Additionally, in the image forming apparatus 1, the user can manually correct the image density difference in the main scanning direction. The user performs this manual operation when the image forming apparatus 1 does not perform the typical operation of the image formation, that is, a printing operation, as in the case of the image density difference correction mode described later. The procedure for manual correction is described below.

First, the user opens a screen (see FIG. 8) for the image density unevenness correction level selection mode on the control panel 60 to correct the image density difference (an image density unevenness) in the main scanning direction of the output image. Subsequently, on the screen, the user selects a desired correction level, that is, a reference image density. In the example of FIG. 8, it is assumed that the user selects level 2 among levels 1 to 7, that is, a correction using gradation images P1 and P2 of gradation images P1 to P4.

The manual operation using the control panel 60 as described above generates a command for correction of the image density unevenness, and the image forming apparatus 1 performs control to correct the image density unevenness, that is, the image density difference in the main scanning direction in a procedure of FIGS. 9A to 9E. Specifically, first, the image forming apparatus 1 performs the image forming process described above to form the gradation image pattern having gradation images P1 to P4 for the correction on the sheet P, as illustrated in FIG. 9A, that is, create an adjustment chart. Subsequently, the line sensor 70 detects the image density difference in the main scanning direction in each of the gradation images P1 to P4 of the adjustment chart on the sheet P (see FIG. 9B).

The CPU 10 performs the correction of the image density difference based on the level selected on the control panel 60. Specifically, the CPU 10 reads image density data of the gradation images P1 and P2 illustrated in FIG. 9C, which corresponds to the level 2 selected in FIG. 8, and calculates correction values of the intensities of exposure light that are the intensities of optical writing light to average and uniform the image density difference in the gradation images P1 and P2 as illustrated in FIG. 9D.

Then, as illustrated in FIG. 9E, the exposure device 101 exposes the photoconductors 120y, 120k, 120m, and 120c with the corrected exposure light based on the calculated correction values. The above-described correction of the image density difference is performed in each color.

In FIGS. 9A to 9E and FIG. 11 described later, reference symbols R, C and F each indicate one end side (rear), the center (center) and the other end side (front) in the main scanning direction.

With reference to FIGS. 10 to 13, a description is provided below of a unique configuration and a unique operation of the image forming apparatus 1 according to the present embodiment in detail.

The image forming apparatus 1 of the present embodiment performs the image density difference correction mode at a predetermined timing and automatically selects the image density level for unevenness correction, that is, a reference image density, which is manually selected in FIG. 8, to optimize the correction (adjustment) of the image density difference in the main scanning direction of the output image.

As described above with reference to FIG. 1, the image forming apparatus 1 includes the printer engine 100 as the image forming section, the line sensor 70 as the image density detector, and the control unit 180 as the correction unit.

The printer engine 100 as the image forming section forms the image on a surface of the sheet P as the image bearer and includes the exposure device 101, the image forming device 102, and the transfer device 103.

The line sensor 70 as the image density difference detector detects the image density difference in the main scanning direction of the image formed on the surface of the sheet P as the image bearer. The line sensor 70 extends in the main scanning direction and is disposed opposite the sheet P on a conveyance path along which the sheet P having passed the image forming unit is conveyed, which is the conveyance path downstream from the fixing device 104 in the present embodiment.

The control unit 180 as the correction unit corrects the image density difference in the main scanning direction in the image formed by the printer engine 100 as the image forming section.

Specifically, the printer engine 100 as the image forming section includes the exposure device 101 that irradiates surfaces of the photoconductors 120y, 120k, 120m, and 120c rotating in a predetermined direction with exposure light along the main scanning direction and forms latent images corresponding to the desired image. The control unit 180 as the correction unit controls to adjust outputs of the exposure lights emitted from the exposure device 101, that is, powers of laser beams, in each of the plurality of areas in the main scanning direction. Optimizing outputs of the exposure lights emitted to each of the plurality of areas on the surface of the photoconductor divided in the main scanning direction optimizes the exposure potential, that is, a latent image potential on the surface of the photoconductor in each area. As a result, the image density is made uniform over the main scanning direction.

The image forming apparatus 1 in the present embodiment is configured to be able to execute the image density difference correction mode.

Figure 10:
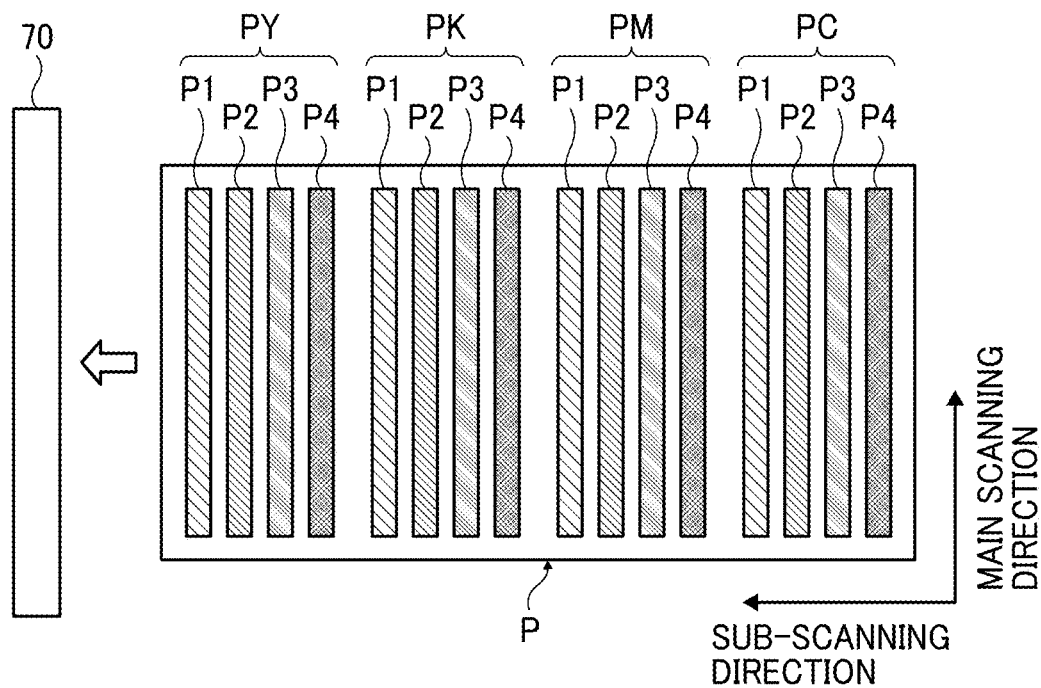
FIG. 10 is a schematic top view illustrating a line sensor and a sheet on which gradation image patterns are formed.

When the image forming apparatus 1 executes the image density difference correction mode, the printer engine 100 forms the gradation image patterns PY, PK, PM, and PC illustrated in FIG. 10 on the surface of the sheet P as the image bearer. The gradation image pattern includes gradation images arranged in the sub-scanning direction and having different image densities stepwise. Each gradation image extends in the main scanning direction and has the same image density in the main scanning direction.

Specifically, as illustrated in FIG. 10, the image forming apparatus 1 in the present embodiment forms the gradation image pattern PY formed by yellow toner, the gradation image pattern PK formed by black toner, the gradation image pattern PM formed by magenta toner, and the gradation image pattern PC formed by cyan toner on one sheet P, that is, forms an adjustment sheet, when the image forming apparatus 1 does not form an output image, for example, at the time of warming up. Each of the four gradation image patterns PY, PK, PM, and PC has four belt-like patterns each of which includes the gradation images P1 to P4 formed at an interval in the sub-scanning direction. Each of the belt-like patterns has the same image density that is a same image area rate in the main scanning direction. In addition, each gradation image P1 to P4 is formed so that the image density that is the image area rate differs stepwise. Specifically, the image density that is the image area rate is increased to 20%, 40%, 70% and 100% in the order of P1, P2, P3 and P4.

Although the gradation image patterns PY, PK, PM, and PC of four colors are formed on one sheet P in the present embodiment, the gradation pattern of one color may be formed on one sheet P, and four sheets may be used for four colors. Although the gradation image pattern in the present embodiment has four gradation images P1 to P4, the number of gradation images is not limited to this.

Although the image densities that are image area rates of the four gradation images P1 to P4 of the gradation image pattern in the present embodiment are 20%, 40%, 70%, and 100%, respectively, the image densities that are image area rates of the gradation images P1 to P4 are not limited to these values and may be set to optimum values according to an environment in which the image forming apparatus 1 is used.

When the image forming apparatus 1 executes the image density difference correction mode, the line sensor 70 as the image density difference detector detects image densities in the main scanning direction, that is, the image density difference in the main scanning direction, in each of a plurality of gradation images P1 to P4 arranged in the sub-scanning direction and having image densities that differs stepwise, which are included in each of the gradation image patterns PY, PK, PM, and PC.

Figure 11C:
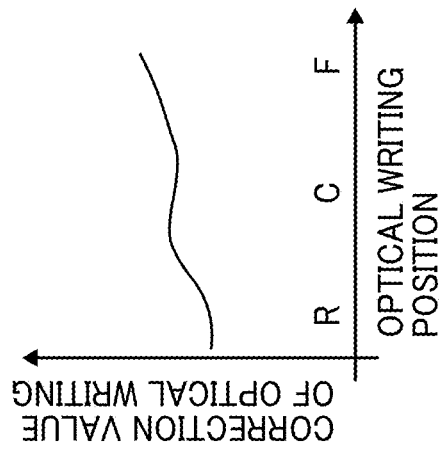
FIGS. 11A to 11C are graphs illustrating a flow of correction mode for an image density difference.
Figure 11B:
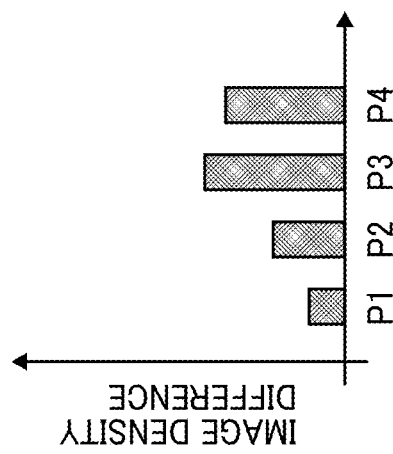
Figure 11A:
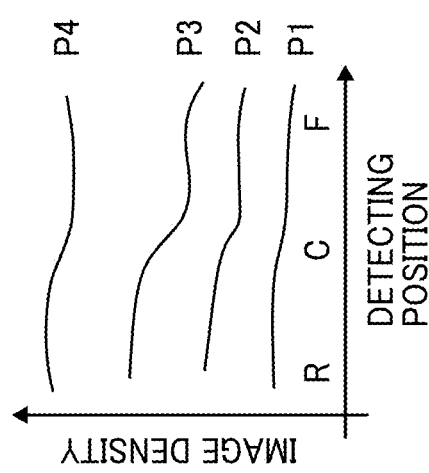

That is, the line sensor 70 optically detects a distribution of the image densities in the main scanning direction for each of the gradation images P1 to P4 as illustrated in FIG. 11A.

Subsequently, based on the detection results, the control unit 180 as the correction unit corrects the image density difference in the main scanning direction.

Specifically, the control unit 180 calculates the image density difference in each of the gradation images P1 to P4 as illustrated in FIG. 11B from the detection results illustrated in FIG. 11A. Next, the control unit 180 obtains correction values of optical writing in the main scanning direction as illustrated in FIG. 11C based on the predetermined condition that is, in the present embodiment, the condition that the reference image density is the image density of the gradation image having the largest image density difference. Specifically, as described above, optimizing outputs of the exposure lights emitted to each of the plurality of areas on the surface of the photoconductor divided in the main scanning direction optimizes the exposure potential, that is, a latent image potential on the surface of the photoconductor in each area. As a result, the image density is made uniform over the main scanning direction.

In the image density difference correction mode according to the present embodiment, the line sensor 70 as the image density difference detector detects the image densities over the main scanning direction in the gradation images P1 to P4 of the gradation image patterns PY, PK, PM, and PC, and the control unit 180 calculates the image density differences in the main scanning direction of the gradation images P1 to P4 based on the detected image densities and corrects the image density difference in the main scanning direction in each color based on the image densities of the gradation image having the largest image density difference of all the calculated image density differences of gradation images P1 to P4 in each of the gradation image patterns PY, PK, PM, and PC. In the example of FIG. 11B, the gradation image having the largest image density difference is the gradation image P3.

That is, the control unit 180 corrects outputs of the exposure lights in the main scanning direction to uniform the image densities in the main scanning direction in the output image having the image density corresponding to the gradation image having the largest image density difference.

A reason why the control unit 180 corrects the image density difference in the main scanning direction based on the image density differences in the main scanning direction of gradation images having different image densities from low image density to high image density is that the image density that is the image area rate of the output image may increase the image difference in the main scanning direction. If the control unit 180 corrects the image density difference in the main scanning direction based on image densities of a gradation image having a specified reference image density, a large image density difference may occur in an output image having an image density different from the specified reference image density.

The image forming apparatus 1 according to the present embodiment automatically corrects the image density difference in the main scanning direction based on the image density differences in the main scanning direction automatically detected from a plurality of gradation images P1 to P4 having different image densities each other, not from the gradation image having the specified reference image density. Therefore, regardless of the image density, the image density difference in the main scanning direction is uniformly reduced without variation.

Even if fluctuations in an operating environment of the image forming apparatus 1, production tolerances of the image forming apparatus 1, and the image density in the output image cause a variation of the image density difference in the main scanning direction, suitably executing the image density difference correction mode stably uniforms the image density in the main scanning direction regardless of the image density in the output image.

Figure 12A:
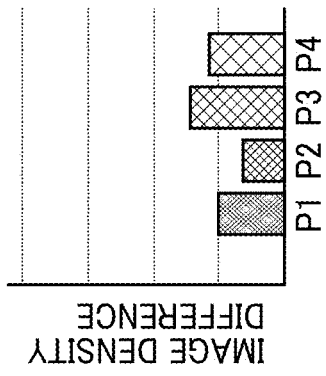
FIG. 12A is a graph illustrating an example of image density differences in the main scanning direction in gradation images detected in the image density difference correction mode.
Figure 12B:
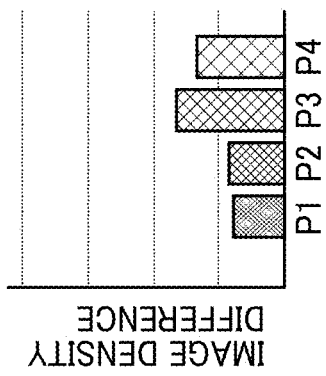
FIGS. 12B to 12E are graphs illustrating examples of correction results of the image density difference correction mode based on image densities of gradation images in FIG. 12A.
Figure 12C:
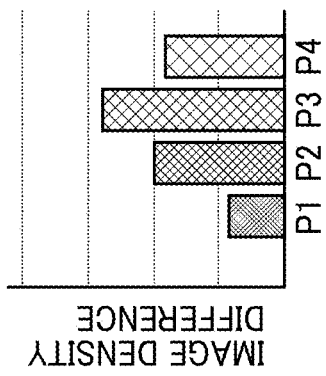
Figure 12D:
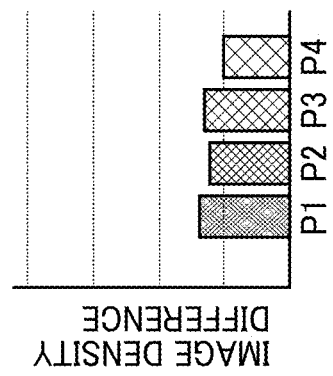
Figure 12E:
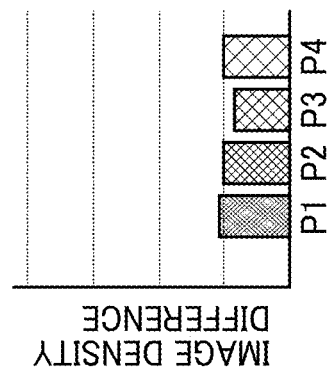

FIG. 12A illustrates an example of image density differences in the main scanning direction in the gradation images P1 to P4 detected in the image density difference correction mode. FIG. 12B illustrates an example of a correction result in which the control unit 180 corrects the image density differences in the gradation images P1 to P4 based on image densities detected the gradation image P1 in FIG. 12A. FIG. 12C illustrates an example of a correction result in which the control unit 180 corrects the image density differences in the gradation images P1 to P4 based on image densities detected the gradation image P2 in FIG. 12A. FIG. 12D illustrates an example of a correction result in which the control unit 180 corrects the image density differences in the gradation images P1 to P4 based on image densities detected the gradation image P3 in FIG. 12A. FIG. 12E illustrates an example of a correction result in which the control unit 180 corrects the image density differences in the gradation images P1 to P4 based on image densities detected the gradation image P4 in FIG. 12A.

When the image density difference in the gradation image P3 is largest as illustrated in FIG. 12A, the correction of the image density difference based on the image densities in the gradation image P1 having an image area rate 20% or the gradation image P2 having an image area rate 40% does not improve the image density differences in the gradation image P3 having an image area rate 70% and the gradation image P4 having an image area rate 100% as illustrated in FIGS. 12B and 12C. The correction of the image density difference based on the image densities in the gradation image P4 having the image area rate 100% greatly deteriorates the image density difference in the gradation image P1 having the image area rate 20% as illustrated in FIG. 12E.

In contrast, the correction of the image density difference based on the image densities in the gradation image P3 having the image area rate 70% in which the largest image density difference in the main scanning direction occurs uniformly corrects the image density differences in the main scanning direction in all gradation images P1 to P4 in a well-balanced manner, and there is not the gradation image having a prominently large image density difference.

The above-described result certifies the effect of the present disclosure.

In the image density difference correction mode according to the present embodiment, the control unit 180 as the correction unit corrects the output of the exposure light at each of the areas divided in the main scanning direction using a shading sensitivity. The shading sensitivity is a slope obtained by dividing an amount of change of the exposure light ΔLP emitted from the exposure device 101 by an amount of change of the image density ΔID caused by the amount of change of the exposure light ΔLP in the reference image density that is determined to correct the image density difference in the main scanning direction based on the results detected by the line sensor 70. In the present embodiment, the reference image density is the image density of the gradation image having the largest image density difference in the main scanning direction.

This results in the uniform image densities in the main scanning direction in a well-balanced manner.

Further, as described above with reference to FIG. 1, the image forming apparatus 1 according to the present embodiment includes the image forming condition adjuster to adjust the image forming condition of the printer engine 100 so that the image density of the patch pattern formed at a predetermined position in the main scanning direction by the printer engine 100 as the image forming section is the target image density.

The image forming section forms the patch pattern on the intermediate transfer belt 130 between output images or while the image forming apparatus 1 does not output images to warm up. The image density sensor 250 detects the image density of the patch pattern. The control unit 180 as the image forming condition adjustor adjusts image forming conditions such as developing biases applied to the developing devices 121y, 121k, 121m and 121c or charging biases applied to the chargers 122y, 122k, 122m and 122c so that the detected image density becomes a target image density.

In the image density difference correction mode according to the present embodiment, the control unit 180 as the correction unit corrects the image density difference in the main scanning direction based on the image density of the gradation image detected by the line sensor 70 at a position at which the image density sensor 250 detects the image density.

That is, the control unit 180 corrects the exposure light amount so that the image densities of the gradation image over the main scanning direction become the image density of the gradation image detected by the line sensor 70 at the position at which the image density sensor 250 detects the image density. This means that the control unit 180 executes the image density difference correction mode under the image forming condition which the control unit adjusts so that the detected image density becomes the target image density.

That is, the control unit 180 corrects the image density of the patch pattern detected by the image density sensor 250 to be the target image density, maintains the image density of the patch pattern that becomes the target image density, and corrects the image density difference in the main scanning direction of the gradation image detected by the line sensor 70.

When the control unit 180 corrects the image density difference in the main scanning direction based on the image density of the gradation image detected by the line sensor 70 at a position at which the image density sensor 250 does not detect the image density, preferably, the control unit 180 forms the patch pattern detected by the image density sensor 250 without correcting the image density difference in the main scanning direction.

Specifically, the control unit 180 calculates the correction value ΔLp of the intensity of exposure light at each writing area in the main scanning direction based on the image density of the gradation image at the position at which the image density sensor 250 detects the image density of the patch pattern, and the image forming condition adjuster adjusts the image forming condition so that the image density detected by the image density sensor 250 becomes the target image density.

Next, the control unit corrects the intensity of exposure light based on the correction value ΔLp. The control unit 180 calculates the correction value ΔLp of the intensity of exposure light based on the following equation:

$$\Delta Lp = \Delta ID / \text{the shading sensitivity}.$$

The shading sensitivity is a slope of change of the image density with respect to the change of the intensity of exposure light and may be measured in the image density difference correction mode or stored in the ROM 20 as a table that is calculated in advance from results of experiments.

Figure 13:
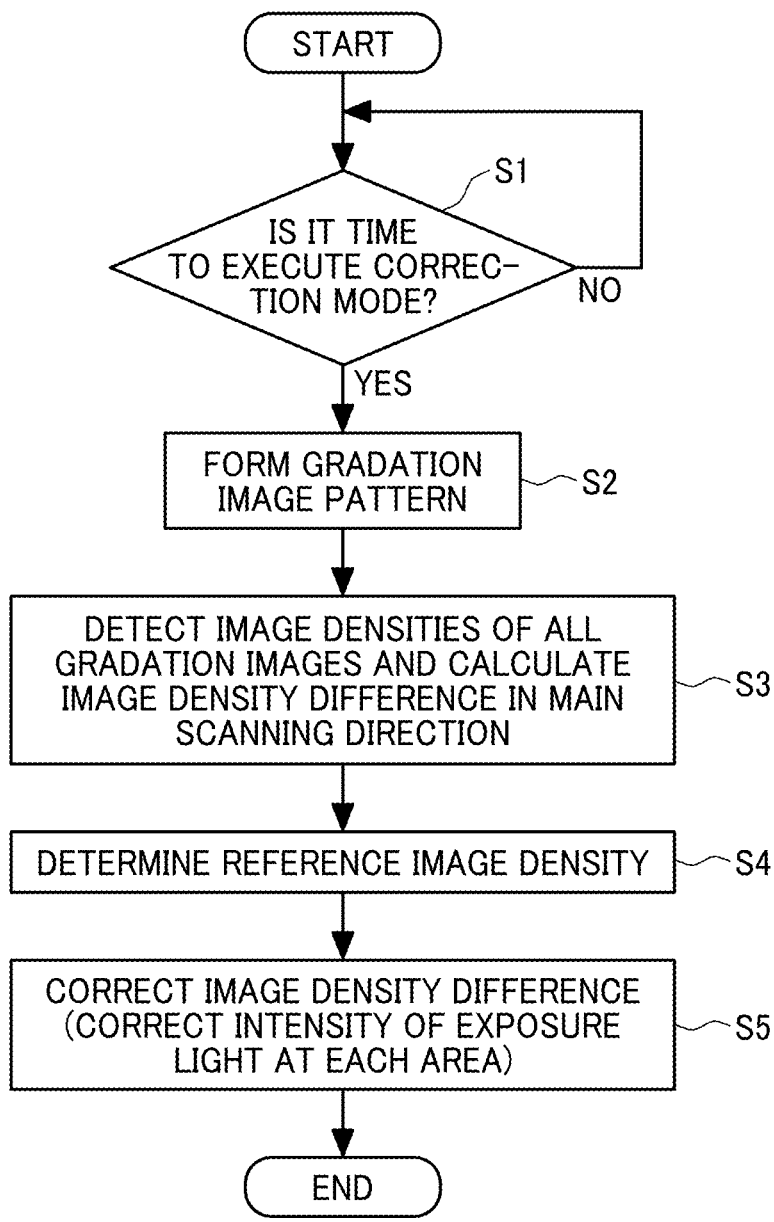
FIG. 13 is a flowchart illustrating a control of the image density difference correction mode.

FIG. 13 is a flowchart illustrating the control of the image density difference correction mode.

As illustrated in FIG. 13, in step S1, the control unit 180 determines whether it is time to execute the image density difference correction mode. When the control unit 180 determines that it is time to execute the correction mode, the control unit 180 controls to form the gradation image patterns PY, PK, PM, and PC on the sheet P and convey the sheet P to the line sensor 70 in step S2. The time to execute the control mode of the image density difference is stored in the ROM 20 or the HDD 40 in advance. For example, the time to execute the control mode is the time of warming up after the cumulative number of printed sheets reaches a predetermined number.

In step S3, the line sensor 70 detects image densities of all gradation images P1 to P4 in the gradation image patterns PY, PK, PM, and PC, and the control unit 180 calculates image density differences in the main scanning direction of all the gradation images P1 to P4.

Based on the above-described results, the control unit 180 determines the reference image density to execute the correction of the image density difference in step S4 and correct the image density difference of the reference image density in step S5. That is, the control unit 180 adjusts the intensity of the exposure light at each area in the main scanning direction to correct the image density difference.

In the present embodiment, the reference image density to correct the image density difference is the image density of the gradation image having the largest image density difference in the gradation images P1 to P4.

In contrast, the reference image density to correct the image density difference may be an image density predicted that the image density difference is large based on the image density differences of the gradation images P1 to P4. For example, when the control unit 180 determines that the image density difference becomes largest at an image density intermediate between the image density of the gradation image P2 and the image density of the gradation image P3 based on a trend of the image density differences of the four gradation images P1 to P4, the control unit 180 executes the image density difference correction mode based on an average image density of the image density of the gradation image P2 and the image density of the gradation image P3.

In the image density difference correction mode as described above, the line sensor 70 as the image density difference detector detects the image densities over the main scanning direction in the gradation images P1 to P4 of the gradation image patterns PY, PK, PM, and PC, and the control unit 180 calculates the image density differences in the main scanning direction of the gradation images P1 to P4 based on the detected image densities, predicts the image density in which the image density difference becomes largest based on the calculated image density differences, and corrects the image density difference in the main scanning direction in each color based on the predicted image density.

The above-described case also uniformly reduces the image density difference in the main scanning direction regardless of the image density without variation.

In the image density difference correction mode according to the present embodiment, the control unit 180 corrects the intensity of the exposure light in each area to correct the image density difference based on the reference image density each time the gradation image patterns PY, PK, PM and PC are created, and the image density differences are detected.

Alternatively, after once the gradation image patterns PY, PK, PM and PC are created, the image density differences are detected, and the reference image density is determined, the control unit 180 may correct the intensity of the exposure light in each area to correct the image density difference based on the determined reference image density in a plurality of times of the correction modes of the image density difference at intervals.

In the image density difference correction mode as described above, the control unit 180 executes the following processes at a predetermined timing X, that is, a process in which the printer engine 100 as the image forming section forms the gradation image patterns PY, PK, PM and PC, a process in which the line sensor 70 as the image density difference detector detects the image densities over the main scanning direction in the gradation images P1 to P4 of the gradation image patterns PY, PK, PM, and PC, and a process in which the control unit 180 calculates the image density differences in the main scanning direction of the gradation images P1 to P4 based on the detected image densities and determines the reference image density to correct the image density difference in the main scanning direction. Subsequently, until the control unit 180 updates the reference image density determined by the processes described above, the control unit 180 as the correction unit corrects the image density difference in the main scanning direction based on the reference image density determined by the processes described above.

The above-described case also uniformly reduces the image density difference in the main scanning direction regardless of the image density without variation. Additionally, the above described case reduces a number of sheets and time to execute the image density difference correction mode because a number of processes in which the gradation image patterns PY, PK, PM and PC are formed, the image density difference detector detects the image densities over the main scanning direction in the gradation images P1 to P4 of the gradation image patterns PY, PK, PM, and PC, and the control unit 180 calculates the image density differences about the gradation image patterns PY, PK, PM, and PC.

In the image density difference correction mode according to the present embodiment, after the processes of creating the gradation image patterns PY, PK, PM, and PC, detecting the image densities, and calculating the image density differences, the control unit 180 once corrects the intensity of the exposure light in each area to correct the image density difference based on the reference image density determined by the processes described above.

On the other hand, the control unit 180 may repeat the image density difference correction mode until the image density difference in the gradation image having the reference image density that is predetermined is equal to or less than a predetermined value. That is, in the image density difference correction mode, after the processes of creating the gradation image patterns PY, PK, PM, and PC, detecting the image densities, and calculating the image density differences, the control unit 180 corrects the intensity of the exposure light in each area to correct the image density difference based on the reference image density determined by the processes described above. After this correction, the printer engine 100 creates the gradation image patterns PY, PK, PM, and PC again, the line sensor 70 detects the image densities of the gradation image patterns PY, PK, PM, and PC again, and the control unit 180 calculates the image density differences and determines whether the image densities are equal to or less than the predetermined value. As a result, when the image density difference does not become the predetermined value or less, the control unit 180 determines the reference image density again and executes the image density difference correction mode again. Thereafter, the same processes are repeated until the image density difference becomes the predetermined value or less.

Therefore, regardless of the image density, the image density difference in the main scanning direction is more uniformly reduced without variation.

In the present embodiment, the control unit 180 automatically executes the image density difference correction mode at a predetermined timing.

In contrast, the control unit 180 may be configured to execute the image density difference correction mode when the user manually operates the control panel 60 as the operation unit at any timing. That is, in addition to the automatic execution of the image density difference correction mode, the control unit 180 may be configured to execute the image density difference correction mode based on the manual operation at any timing. This image density difference correction mode based on the manual operation is different from the correction of the image density difference by the manual operation of the user as illustrated in FIGS. 8 and 9 described above. In FIGS. 8 and 9, the user manually selects the reference image density for the correction of the image density difference. In this image density difference correction mode, the user manually instructs the execution of the image density difference correction mode at a desired timing, and the control unit 180 automatically determines the reference image density for the correction of the image density difference based on the image density differences calculated from the image densities detected.

After the control unit 180 automatically executes the image density difference correction mode, the user can check the image density difference of the output image again, if necessary, manually execute the image density difference correction mode, and improve accuracy of the correction of the image density difference. Alternatively, after the control unit 180 automatically executes the image density difference correction mode, the user may check the image density difference of the output image again, manually execute the image density difference correction mode several times, and improve accuracy of the correction of the image density difference. Or, after the control unit 180 automatically executes the image density difference correction mode, the user may check the image density difference of the output image again, manually executes the image density difference correction mode to slightly correct the image density difference, and improve accuracy of the correction of the image density difference.

As described above, the image forming apparatus 1 according to the present embodiment is configured to be able to execute the image density difference correction mode. In the image density difference correction mode, the printer engine 100 forms the gradation image patterns PY, PK, PM, and PC on the surface of the sheet P as the image bearer. The gradation image pattern includes gradation images arranged in the sub-scanning direction and having different image densities stepwise. Each gradation image extends in the main scanning direction and has the same image density in the main scanning direction. Subsequently, in the image density difference correction mode, the line sensor 70 as the image density difference detector detects the image densities over the main scanning direction in the gradation images P1 to P4 of the gradation image patterns PY, PK, PM, and PC, and the control unit 180 as the correction unit calculates the image density differences in the main scanning direction of the gradation images P1 to P4 based on the detected image densities and corrects the image density differences.

Therefore, regardless of the image density, the image density difference in the main scanning direction is uniformly reduced without variation.

Although the line sensor 70 as the image density difference detector in the present embodiment is disposed the downstream from the fixing device 104, a position of the line sensor 70 is not limited to this and may be on the conveyance path along which the sheet P having formed the gradation image patterns and passed the image forming unit is conveyed.

Further, in the present embodiment, the printer engine 100 forms the gradation image patterns on the sheet P as the image bearer, and the line sensor 70 as the image density difference detector detects the image densities of the gradation image patterns on the sheet P. However, the image bearer on which the gradation image patterns are formed is not limited to the sheet. For example, the gradation image patterns may be formed on the intermediate transfer belt 130 as the image bearer, and the image density difference detector disposed opposite the intermediate transfer belt 130 may detect the image density difference of the gradation image pattern on the intermediate transfer belt 130.

Although the image forming apparatus 1 according to the present embodiment includes photoconductors for four color toner images disposed opposite the intermediate transfer belt 130 and arranged in the order of the photoconductor for the cyan (C) toner image, the photoconductor for the magenta (M) toner image, the photoconductor for the black (K) toner image, and the photoconductor for the yellow (Y) toner image from the upstream side, the order of the photoconductors are not limited to this. For example, the arrangement of the four photoconductors in the image forming apparatus according to the present disclosure may be the order of the photoconductor for the yellow (Y) toner image, the photoconductor for the magenta (M) toner image, the photoconductor for the cyan (C) toner image, and the photoconductor for the black (K) toner image from the upstream side.

In such configurations, effects similar to those described above are also attained.

The present disclosure is not limited to the above-described embodiments, and the configuration of the present embodiment can be appropriately modified other than suggested in each of the above embodiments within a scope of the technological concept of the present disclosure. Also, the positions, the shapes, and the number of components are not limited to the embodiments, and they may be modified suitably in implementing the present disclosure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

Each of the functions of the described embodiments may be implemented by one or more processing circuits or control circuitry. Processing circuits includes a programmed processor, as a processor includes control circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus comprising:
   at least one image bearer;
   an image forming section configured to form a plurality of gradation image patterns on the at least one image bearer, each gradation image pattern formed using a different color toner,
   wherein each gradation image pattern comprises a plurality of continuous stripes extending in a main scanning direction,
   wherein the continuous stripes have a same target image density in the main scanning direction and different target image densities stepwise in a sub-scanning direction;
   an image density difference detector configured to detect image density differences in the main scanning direction; and
   in response to executing an image density difference correction mode, control circuitry is configured, for each of the gradation image patterns, to identify a continuous stripe having a largest density variation in the main scanning direction, to generate an image density correction factor for the color toner used for the gradation image pattern based on the identified continuous stripe, and to reduce image density variations in the main scanning direction for the color toner using the image density correction factor.

2. The image forming apparatus according to claim 1,
wherein, at a predetermined timing, the image forming section forms the gradation image patterns, and the control circuitry, for each of the gradation image patterns, identifies the continuous stripe having the largest density variation in the main scanning direction, generates the image density correction factor for the color toner used for the gradation image pattern based on the identified continuous stripe, and reduces image density variations in the main scanning direction for the color toner using the image density correction factor until the image density correction factor is updated when the predetermined timing reoccurs.

3. The image forming apparatus according to claim 1, further comprising an image density sensor to detect an image density of the continuous stripe at a predetermined position in the main scanning direction, wherein the control circuitry corrects an image forming condition of the image forming section based on the image density of the continuous stripe detected by the image density sensor, generates the image density correction factor for the color toner used for the gradation image pattern based on the image density of the continuous stripe at the predetermined position in the main scanning direction, and reduces the image density variations in the main scanning direction for the color toner using the image density correction factor.

4. The image forming apparatus according to claim 1,
wherein the image forming section includes a rotatable photoconductor and an exposure device that emits exposure light across the photoconductor in the main scanning direction to form a latent image, and the control circuitry corrects an output of exposure light for each of a plurality of areas divided in the main scanning direction.

5. The image forming apparatus according to claim 4,
wherein the control circuitry corrects the output of the exposure light for each of the plurality of areas divided in the main scanning direction, using a sensitivity obtained by dividing an amount of change of the output of the exposure light by an amount of change of an image density determined to correct the image density differences in the main scanning direction.

6. The image forming apparatus according to claim 1,
wherein the control circuitry repeats the image density difference correction mode until an image density difference in a gradation image formed at a predetermined image density is equal to or less than a predetermined value.

7. The image forming apparatus according to claim 1, further comprising an operation unit,
wherein the control circuitry executes the image density difference correction mode based on a manual operation performed on the operation unit.

8. The image forming apparatus according to claim 1,
wherein the at least one image bearer is at least one recording medium sheet, and the image density difference detector is a line sensor that extends in the main scanning direction and is disposed opposite the at least one recording medium sheet on a conveyance path along which the at least one recording medium sheet having passed the image forming section is conveyed.

* * * * *